(12) United States Patent
Michaud et al.

(10) Patent No.: US 12,159,424 B2
(45) Date of Patent: Dec. 3, 2024

(54) SYSTEM AND METHOD FOR DETERMINING THE THREE-DIMENSIONAL PROFILE OF A SURFACE USING A PLENOPTIC CAMERA AND STRUCTURED LIGHTING

(71) Applicant: SAFRAN, Paris (FR)

(72) Inventors: Franck Michaud, Moissy-Cramayel (FR); Ahmed Nasreddinne Benaichouche, Moissy-Cramayel (FR)

(73) Assignee: SAFRAN, Paris (FR)

(*) Notice: Subject to any disclaimer, the term of this patent is extended or adjusted under 35 U.S.C. 154(b) by 363 days.

(21) Appl. No.: 17/757,795

(22) PCT Filed: Dec. 14, 2020

(86) PCT No.: PCT/FR2020/052408
§ 371 (c)(1),
(2) Date: Jun. 21, 2022

(87) PCT Pub. No.: WO2021/130425
PCT Pub. Date: Jul. 1, 2021

(65) Prior Publication Data
US 2023/0342961 A1    Oct. 26, 2023

(30) Foreign Application Priority Data
Dec. 24, 2019  (FR) ...................... 1915556

(51) Int. Cl.
*G06T 7/557* (2017.01)
*G06T 7/521* (2017.01)
(Continued)

(52) U.S. Cl.
CPC .............. *G06T 7/557* (2017.01); *G06T 7/521* (2017.01); *G06V 10/141* (2022.01); *G06V 10/60* (2022.01); *H04N 23/957* (2023.01)

(58) Field of Classification Search
CPC ..................... G06T 7/557; G06T 7/521; G06T 2207/10052; G06T 2200/21;
(Continued)

(56) References Cited

U.S. PATENT DOCUMENTS

2014/0078264 A1   3/2014  Zhang
2016/0202048 A1   7/2016  Meng et al.
2022/0357151 A1*  11/2022 Liang ................. G01B 11/2504

OTHER PUBLICATIONS

International Search Report for issued in Application No. PCT/FR2020/052408 dated Mar. 29, 2021.
(Continued)

*Primary Examiner* — Christopher Wait
(74) *Attorney, Agent, or Firm* — Pearne & Gordon LLP

(57) ABSTRACT

In the field of determining the three-dimensional profile of a surface, a system and a method for determining such a three-dimensional profile use a plenoptic camera and a structured lighting system. The method includes: acquiring a sequence of plenoptic images, each formed by a set of pixels each associated with a light intensity of an imaged surface element, and including a plurality of sub-images of the surface from different viewing angles, projecting onto the surface a sequence of structured images synchronised with the sequence of plenoptic images illuminating each imaged surface element by a succession of light intensities different from the successions of light intensities which illuminate the other imaged surface elements, constructing, for each pixel of the plenoptic image, an intensity vector representing the succession of light intensities, and pairing each pixel of a sub-image with a pixel of another sub-image depending on a similarity of the intensity vectors.

13 Claims, 3 Drawing Sheets

(51) Int. Cl.
G06V 10/141 (2022.01)
G06V 10/60 (2022.01)
H04N 23/957 (2023.01)

(58) Field of Classification Search
CPC .... G06V 10/141; G06V 10/60; H04N 23/957; H04N 13/0282; G01B 11/2513; G01B 11/2527; G01B 11/2545
See application file for complete search history.

(56) References Cited

OTHER PUBLICATIONS

Written Opinion for PCT/FR2020/052408 dated Mar. 29, 2021.
Search Report issued in French Patent Application No. 1915556 dated Sep. 15, 2020.
Zewei, Cai, et al.: "Structured light field 3D imaging", Optics Express, Aug. 25, 2016, pp. 20324-20334, vol. 24, No. 18, XP055730040.

* cited by examiner

SYSTEM AND METHOD FOR DETERMINING THE THREE-DIMENSIONAL PROFILE OF A SURFACE USING A PLENOPTIC CAMERA AND STRUCTURED LIGHTING

This is the National Stage of PCT international application PCT/FR2020/052408, filed on Dec. 14, 2020 entitled "SYSTEM AND METHOD FOR DETERMINING THE THREE-DIMENSIONAL PROFILE OF A SURFACE USING A PLENOPTIC CAMERA AND STRUCTURED LIGHTING", which claims the priority of French Patent Application No. 1915556 filed Dec. 24, 2019, both of which are incorporated herein by reference in their entireties.

TECHNICAL FIELD

The invention concerns the field of determining the three-dimensional profile of a surface. It relates to a system for determining such a profile comprising a lighting system arranged to project structured illumination onto this surface, a plenoptic camera arranged to acquire plenoptic images of the surface and a processing unit arranged to reconstruct depth information from the images acquired by the plenoptic camera. The invention further relates to a method for determining the three-dimensional profile of a surface.

The invention applies in particular to controlling and inspecting the surface of a part in an industrial environment, but can also be applied in other fields involving determining the three-dimensional profile of one or more surfaces of an object, such as video surveillance or driver assistance systems.

PRIOR ART

Quality control of a mechanical part is a common problem in the manufacturing industry. This type of control can in particular be carried out using ultrasonic sensors, probes or by image processing. In particular, the purpose of this control can be to check that a surface of the mechanical part reproduces a desired profile with a predetermined tolerance margin. For this purpose, a control based on image processing typically comprises acquiring a pair of stereoscopic images, matching the pixels of the stereoscopic images by searching for shape similarities in the images, and determining depth information by triangulation based on the respective positions of the pixels in the images.

Instead of a stereoscopic image acquisition system, a plenoptic camera that generates a plurality of images from different viewing angles can also be used. A plenoptic camera offers an interesting compromise between measurement performance and system compactness. However, the determination of depth information still relies on pixel matching between two or more images by searching for shape similarities. However, the process of searching for shape similarities requires significant computational resources and can be particularly complicated or even impossible for surfaces with few or no features, for example variations in shape, colour or texture. One solution to facilitate image matching is to add physical markers on the object to be inspected. However, this solution is burdensome since it involves the placement and possible removal of these physical markers. Moreover, it is not always applicable and depends on the objects to be inspected.

Another solution to facilitate image matching is to associate image acquisition with a specific lighting. The measurement method is thus referred to as an "active measurement method". It consists of projecting a known structured lighting onto the object and of searching for spatial or phase similarities linked to this structured lighting. In particular, fringes can be projected using laser interferometry or a video projector, or a set of patterns with a regular or pseudorandom spatial distribution can be generated. However, these techniques still involve a spatial similarity search process that is expensive in terms of computational resources. Moreover, a plenoptic camera has a high number of sub-apertures and the patterns of the illumination must thus have low redundancy in order not to cause pixel matching ambiguity. In practice, active measurement methods are difficult to use with a plenoptic camera.

In view of the above, the invention aims to provide a method for determining the three-dimensional profile of a surface using a plenoptic camera that is simple and robust. The invention further aims to provide a system for determining the three-dimensional profile of a surface whose design, manufacturing and maintenance costs are compatible with use on an industrial scale.

DESCRIPTION OF THE INVENTION

To this end, the invention is based on the projection of a changing structured image onto the surface whose profile is to be determined, the acquisition of a sequence of plenoptic images of the surface and the search for temporal similarities between pixels of different sub-images constituting the plenoptic images.

More specifically, the invention relates to a system for determining the three-dimensional profile of a surface comprising:

a plenoptic camera arranged to acquire a sequence of plenoptic images of the surface, each plenoptic image being formed by a set of pixels which are each associated with a light intensity of an imaged surface element, and comprising a plurality of sub-images of the surface from different viewing angles,
 a lighting system arranged to project, onto the surface, a sequence of structured images which is synchronised with the sequence of plenoptic images, so that each imaged surface element is illuminated by a succession of light intensities which is different from the successions of light intensities which illuminate the other imaged surface elements, and
 a processing unit arranged to construct, for each pixel of the plenoptic image, an intensity vector which represents the succession of light intensities of the imaged surface element corresponding to the pixel in question, and to match each pixel of a sub-image with a pixel of another sub-image as a function of a similarity between the intensity vectors thereof.

By varying the structured images during the sequence, the light intensity projected onto the imaged surface elements, and thus the light intensity reflected from these imaged surface elements, also vary. Each imaged surface element can thus reflect a light intensity that varies in a unique manner compared to the other imaged surface elements. The plenoptic image sequence is synchronised with the structured image sequence. In other words, each plenoptic image is acquired during the projection of a structured image. Thus, during a sequence, the changes to the light intensity of one pixel are necessarily different from the changes to the light intensity of another pixel, since these two pixels are associated with different imaged surface elements. Conversely, the presence of pixels with the same or similar changes to the light intensity thereof indicates that these pixels are associated with the same imaged surface element.

The number of plenoptic images and of structured images in a sequence, denoted N, depends in particular on the number of pixels in the sub-images. The higher the number of pixels, the larger N must be. Preferably, N is greater than or equal to 10. For example, for sub-images each formed by an array of 100 pixels by 100 pixels, N can in particular be greater than or equal to 50 or greater than or equal to 100.

According to one specific embodiment, the lighting system is arranged so that each structured image is formed by a set of projected patterns having a random light intensity distribution. A random light intensity distribution implies that there is no periodicity or pseudo-periodicity of the projected patterns in any direction or in the plane.

The lighting system can include:
- a transmission mask formed by a set of patterns each having a transmittance that can take at least one of two different values, and
- a light source arranged to illuminate the surface by projection through the transmission mask.

The patterns of the transmission mask have dimensions of the order of 10 µm (micrometres) for example. Each pattern can in particular be either a rectangle or a square. The set of patterns is, for example, in the form of an array arranged in rows and columns.

Preferably, the lighting system is arranged such that the patterns each have dimensions smaller than the dimensions of the imaged surface elements.

Each pattern of the transmission mask can have a transmittance that can take a value of zero or one, i.e. it can completely block the energy of a light beam or allow the entirety thereof to pass therethrough. The transmittance can also take a first value comprised between 0 and 20% and a second value comprised between 80% and 100%. The transmission mask has, for example, an overall transmittance of 50%.

Alternatively, each pattern of the transmission mask can have a transmittance that can take a plurality of values, for example 8, 64, 128 or 256 values.

According to one specific embodiment, the lighting system further includes a displacement device arranged to displace the transmission mask and/or the light source relative to the surface, so as to project the different structured images of the sequence.

The light source can be a point source. It can thus be displaced alone to obtain the different structured images. It can also take the form of a backlighting. In particular, it can include an array of light emitting diodes. When the light source has an extent greater than that covered by the transmission mask in the positions associated with the different structured images in the sequence, the light source is not necessarily displaced.

In one specific embodiment, the displacement device includes:
- a support arranged to receive the transmission mask, and
- a positioning plate arranged to displace the support along at least one axis of rotation or translation.

In particular, the support can include a frame inside which the transmission mask can be positioned and fixed.

The positioning plate is, for example, arranged to displace the support along an axis of rotation parallel to a projection axis of the light source. The axis of rotation is preferably eccentric to a centre of the transmission mask. Alternatively, the positioning plate can be arranged to displace the support along a first translation axis and a second translation axis, the first and second translation axes defining a plane perpendicular to the projection axis of the light source.

Also in one specific embodiment, the patterns of the transmission mask have a first dimension along a first axis and a second dimension along a second axis, and the displacement device is arranged to displace the transmission mask and/or the light source, between two successive structured images, by a displacement step greater than or equal to the greater of the first and second dimensions. Preferably, the displacement step is greater than or equal to twice the greater of the first and second dimensions.

According to one specific embodiment, each pattern of the transmission mask comprises liquid crystals, the lighting system further including a set of electrodes arranged on either side of the patterns and a control unit arranged to supply power to the electrodes so as to individually control the transmittance of each pattern. The transmission mask thus forms a liquid crystal display. This specific embodiment can optionally be combined with that in which the lighting system includes a displacement device for displacing the transmission mask. The plenoptic images are thus formed as a function of the transmittance of each pattern and as a function of the position of the transmission mask relative to the surface.

Preferably, the light source is monochromatic. The light source emits, for example, a beam at a wavelength of 405 nm (nanometres), 465 nm, 525 nm or 625 nm. A monochromatic light source avoids chromatic dispersion and thus produces projected patterns with sharp edges.

Also preferably, the light source is non-coherent or has low temporal coherence. A coherent light source is capable of generating speckles on the illuminated surface. These speckles thus add to the projected patterns and could disrupt the recognition thereof.

According to one specific embodiment, the plenoptic camera includes:
- a photosensor comprising a set of sensing elements, and
- a set of microlenses, each microlens being associated with a subset of sensing elements of the photosensor such that each subset of sensing elements can generate a sub-image.

The sensing elements of the photosensor are, for example, arranged in the form of rows and columns. Similarly, the microlenses can be arranged in the form of rows and columns. For example, the photosensor can include 15,000 rows by 15,000 columns of photosensors and 150 rows by 150 columns of microlenses. Each microlens is thus associated with a set of 100 rows by 100 columns of sensing elements.

In one specific embodiment, the processing unit is arranged to search, for each sequence of sub-images associated with a given microlens and for each pixel of the sub-images considered, the one or more pixels having the most similar intensity vectors from among the pixels of the sequences of sub-images associated with the neighbouring microlenses of the given microlens. The neighbouring microlenses of a given microlens comprise at least the two adjacent microlenses located in the same column and in the rows below and above, and the two adjacent microlenses located in the same row and in the columns before and after. The neighbouring microlenses can also comprise the four microlenses located in a row below or above and in a column before or after. More generally, the neighbouring microlenses can comprise a neighbourhood of rank P, where P denotes the maximum offset between the row rank of the given lens and the row rank of the neighbouring lens, and the maximum offset between the column rank of the given lens and the column rank of the neighbouring lens. Thus, a neighbourhood of rank 2 comprises twenty-four neighbouring microlenses. When a plurality of pixels of different sequences of sub-images have a similar intensity vector to the pixel considered, all of these pixels can be taken into account.

The processing unit can further be arranged to determine depth information for each imaged surface element as a function of the matched pixels associated with said imaged surface element. In particular, the respective position of the sensing elements that generated the matched pixels allows, by triangulation, distance information for the imaged surface element to be determined.

The invention further relates to a method for determining the three-dimensional profile of a surface comprising the steps of:
- acquiring a sequence of plenoptic images, each plenoptic image being formed by a set of pixels which are each associated with a light intensity of an imaged surface element, and comprising a plurality of sub-images of the surface from different viewing angles,
- projecting, onto the surface, a sequence of structured images which is synchronised with the sequence of plenoptic images, so that each imaged surface element is illuminated by a succession of light intensities which is different from the successions of light intensities which illuminate the other imaged surface elements,
- constructing, for each pixel of the plenoptic image, an intensity vector which represents the succession of light intensities of the imaged surface element corresponding to the pixel in question, and
- matching each pixel of a sub-image with a pixel of another sub-image as a function of a similarity between the intensity vectors thereof.

BRIEF DESCRIPTION OF THE FIGURES

Other features, details and advantages of the invention will appear after reading the following description, which is provided for purposes of illustration only, given with reference to the accompanying drawings, for which.

DETAILED DESCRIPTION

Figure 1:
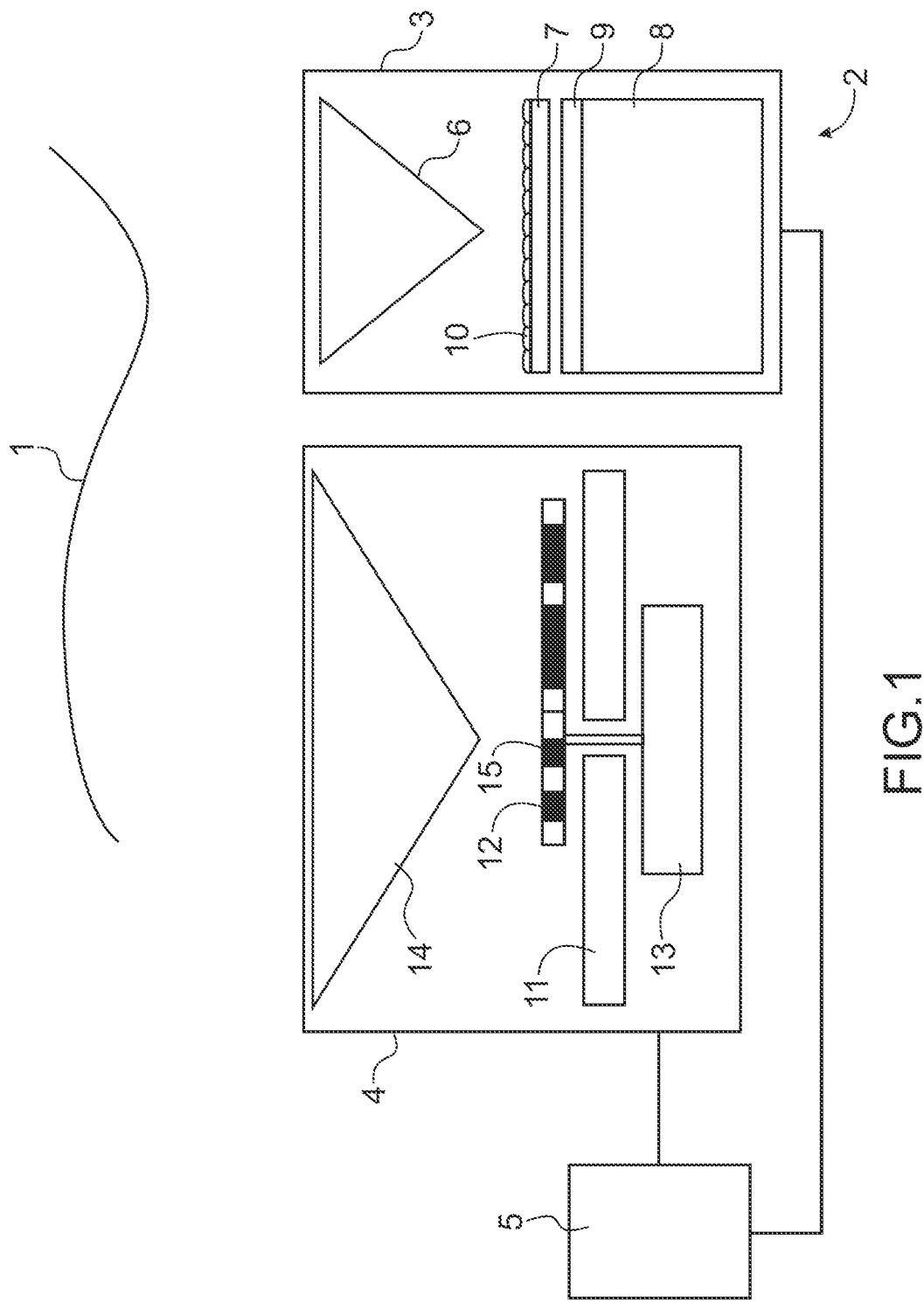
FIG. 1 diagrammatically shows a first example of a system for determining the three-dimensional profile of a surface according to the invention.

FIG. 1 diagrammatically shows a first example of a system for determining the three-dimensional profile of a surface according to the invention. The surface whose three-dimensional profile is to be reconstructed is denoted by the reference numeral 1. The system 2 comprises a plenoptic camera 3, a lighting system 4 and a processing unit 5.

The plenoptic camera 3 includes an optical acquisition lens 6, a microlens array 7 and a photosensor 8. The optical acquisition lens 6 is arranged to direct a part of the light beam reflected from the surface 1 towards the microlens array 7. The photosensor 8 is a planar sensor comprising a set of sensing elements 9 organised in an array. For example, it comprises a set of 15,000 rows by 15,000 columns of sensing elements. The photosensor 8 is, for example, sensitive to visible wavelengths. It is at least sensitive to the wavelengths of the light beam emitted by the lighting system 4. The photosensor 8 can thus generate plenoptic images formed by 15,000×15,000 pixels, each pixel being representative of a light intensity emanating from the surface element imaged by this pixel. The microlens array 7 comprises a set of microlenses 10 also organised into rows and columns. For example, it comprises 150 rows by 150 columns of microlenses. Each microlens 10 is associated with an independent subset of sensing elements 9. Each subset is formed by adjacent sensing elements, such that a sub-image corresponding to a part of the plenoptic image can be generated. In this case, each microlens 10 and each associated subset of sensing elements 9 is capable of generating a sub-image of 100 rows by 100 columns of pixels. The microlenses 10 are arranged in such a way that the different sub-images represent, in pieces, the surface 1 viewed from different viewing angles.

The lighting system 4 includes a light source 11, a transmission mask 12, a motor 13 and an optical projection lens 14. The light source 11 is arranged to homogeneously illuminate the transmission mask 12. It comprises, for example, an array of light-emitting diodes. Preferably, the light source 11 emits a non-coherent light beam at a single wavelength, for example at 405 nm. The transmission mask 12 is formed by a set of patterns 15, each of which has a transmittance that can take either a zero value or a value close to zero, or a unit value or a value close to the unit value. In other words, each pattern 15 is arranged to either block or pass the light beam emitted by the light source 11. Each pattern 15 is, for example, in the form of a square with a side length of 10 μm (micrometres). The transmission mask 12 comprises, for example, an opaque plate in which openings are made so as to form alternating open and closed patterns. The patterns 15 are, for example, organised in the form of an array. Preferably, they are arranged to have a random distribution of the transmittance values. The motor 13 is arranged such that it rotates the transmission mask 12 about an axis parallel to the axis of the light beam emitted by the light source 11. This is a stepping motor for example. The motor 13 is arranged to place the transmission mask 12 in at least N different positions, where N is a natural number greater than or equal to 10. Preferably, N is greater than or equal to 100. The optical projection lens 14 is arranged to focus the light beam emitted by the light source 11 and filtered by the transmission mask 12 on the surface 1. The optical projection lens 14 can be a telecentric lens, in order to obtain a large depth of field. The lighting system 4 thus enables so-called structured images to be generated on the surface 1, each structured image being formed by the projection of the patterns 15 of the transmission mask 12 onto the surface 1. When the patterns 15 have a random distribution of transmittance values, each structured image has a corresponding random distribution of light intensity.

The processing unit 5 is arranged to control, in a synchronised manner, the plenoptic camera 3 and the lighting system 4. It is arranged to command the lighting system 4 to successively project N structured images and to command the plenoptic camera 3 to acquire N plenoptic images, synchronised with the N structured images. Each plenoptic image is thus acquired during the projection of a structured image. In the example embodiment shown in FIG. 1, the N plenoptic images are obtained by displacing the transmission mask. This displacement is arranged such that each surface element imaged by the plenoptic camera 3 is illuminated by a succession of light intensities that is different from the successions of light intensities illuminating the other imaged surface elements. Thus, each imaged surface element can be individually identified in the different sub-images of the plenoptic images. To this end, the processing unit 5 is arranged to construct, for each pixel of the plenoptic image, an intensity vector which represents the succession of light intensities of the imaged surface element corresponding to the pixel in question. The processing unit 5 can be furthermore arranged to match each pixel of a sub-image with a pixel of another sub-image as a function of a similarity between the intensity vectors thereof. Different similarity methods can be used, for example methods based on a correlation coefficient, on squared intensity differences (SD), on absolute intensity differences (AD) or on mean absolute differences (MAD). Finally, the processing unit 5 can be arranged to determine depth information for each imaged surface element as a function of the matched pixels associated with said imaged surface element. Conventionally, this depth information can be obtained by triangulation.

Figure 2:
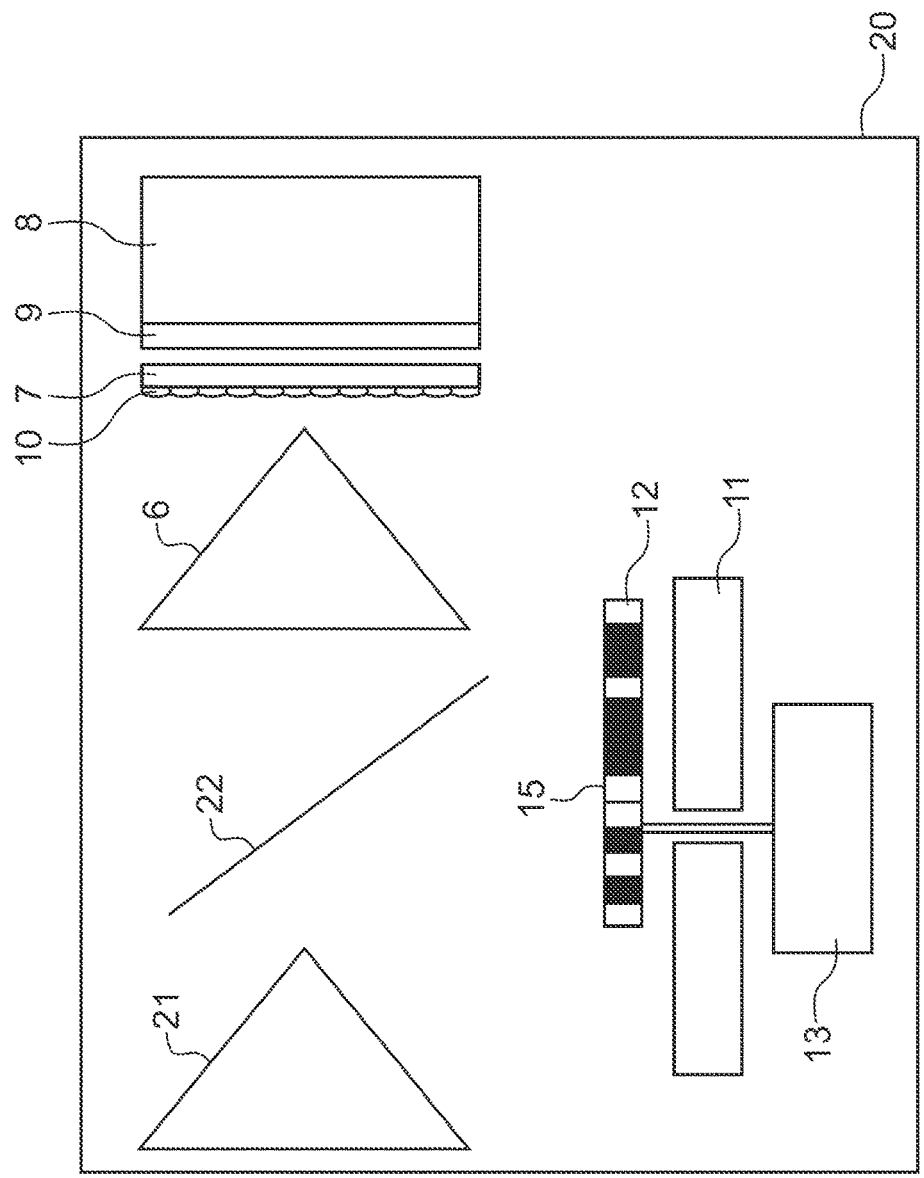
FIG. 2 diagrammatically shows a second example of a system for determining the three-dimensional profile of a surface according to the invention.
Figure 2:
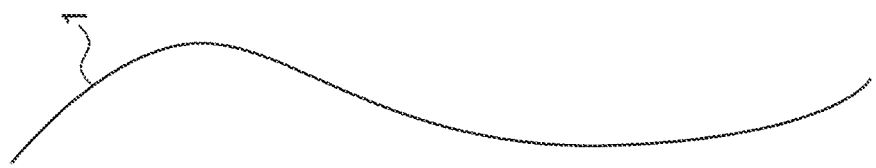

FIG. 2 diagrammatically shows a second example of a system for determining the three-dimensional profile of a surface according to the invention. The system 20 comprises a plenoptic camera and a lighting system in a coaxial configuration. Similarly to the system 2 in FIG. 1, the system 20 comprises an optical acquisition lens 6, a microlens array 7, a photosensor 8, a light source 11, a transmission mask 12 and a motor 13. It further includes a common optical lens 21 and an intensity splitting plate 22. The intensity splitting plate 22 is arranged, on the one hand, to transmit a part of the light beam from the transmission mask 12 towards the common optical lens 21 and, on the other hand, to transmit a part of the light beam from the common optical lens 21 towards the photosensor 8. Thus, the structured images are projected onto the surface 1 along an optical axis identical to the optical axis along which the plenoptic images are acquired.

Figure 3:
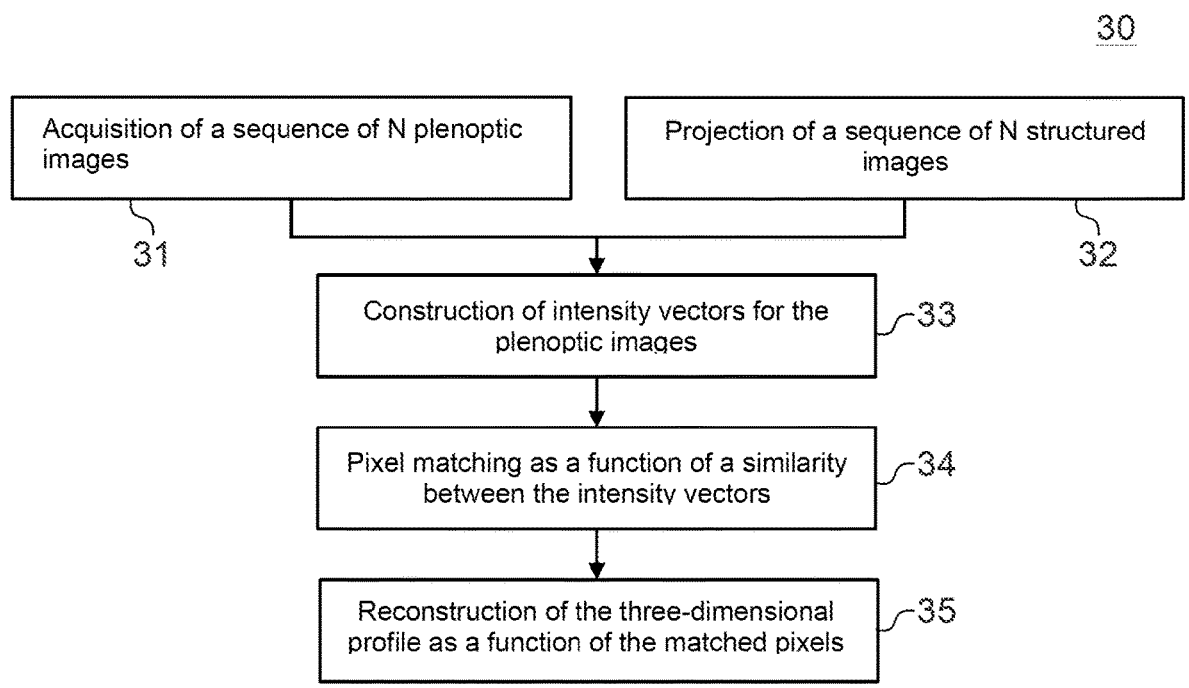
FIG. 3 shows an example of a method for determining the three-dimensional profile of a surface according to the invention.

FIG. 3 shows an example of a method for determining the three-dimensional profile of a surface according to the invention. By way of illustration, the method 30 is considered to be implemented using the system 2 in FIG. 1. The method 30 comprises a step 31 of acquiring a sequence of N plenoptic images, a step 32 of projecting a sequence of N structured images, a step 33 of constructing intensity vectors, a step 34 of matching the pixels and a step 35 of reconstructing the three-dimensional profile of the surface. The step 31 of acquiring the plenoptic images, carried out by the plenoptic camera 3, and the step 32 of projecting the structured images, carried out by the lighting system 4, are synchronised, each plenoptic image being acquired during the projection of a corresponding structured image. The step 33 of constructing the intensity vectors is carried out by the processing unit 5. As stated hereinabove, it consists of forming a vector of dimension N for each pixel of the plenoptic image, containing the different light intensities quantified by the corresponding sensing element of the photosensor 8. The pixel matching step 34 consists of searching, for each pixel of a sub-image, the pixel of one or more other sub-images that has the same or a similar intensity vector. The search is preferably carried out among the neighbouring sub-images, i.e. the sub-images associated with microlenses 10 neighbouring the microlens associated with the sub-image considered. The three-dimensional profile reconstruction step 35 consists of determining distance information for each imaged surface element as a function of the matched pixels corresponding to this imaged surface element. The distance information is determined along the optical axis of the plenoptic camera 3.

What is claimed is:

1. System for determining the three-dimensional profile of a surface comprising:
    a plenoptic camera arranged to acquire a sequence of plenoptic images of the surface, each plenoptic image being formed by a set of pixels which are each associated with a light intensity of an imaged surface element, and comprising a plurality of sub-images of the surface from different viewing angles,
    a lighting system arranged to project, onto the surface, a sequence of structured images which is synchronised with the sequence of plenoptic images, so that each imaged surface element is illuminated by a succession of light intensities which is different from the successions of light intensities which illuminate the other imaged surface elements, and
    a processing unit arranged to construct, for each pixel of the plenoptic image, an intensity vector which represents the succession of light intensities of the imaged surface element corresponding to the pixel in question, and to match each pixel of a sub-image with a pixel of another sub-image as a function of a similarity between the intensity vectors thereof.

2. The system according to claim 1, wherein the lighting system is arranged so that each structured image is formed by a set of projected patterns having a random light intensity distribution.

3. The system according to claim 1, wherein the lighting system includes:
    a transmission mask formed by a set of patterns each having a transmittance that can take at least one of two different values, and
    a light source arranged to illuminate the surface by projection through the transmission mask.

4. The system according to claim 3, wherein the lighting system further includes a displacement device arranged to displace the transmission mask and/or the light source relative to the surface, so as to project the different structured images of the sequence.

5. The system according to claim 4, wherein the displacement device includes:
    a support arranged to receive the transmission mask, and
    a positioning plate arranged to displace the support along at least one axis of rotation or translation.

6. The system according to claim 4, wherein the patterns of the transmission mask have a first dimension along a first axis and a second dimension along a second axis, and the displacement device is arranged to displace the transmission mask and/or the light source, between two successive structured images, by a displacement step greater than or equal to the greater of the first and second dimensions.

7. The system according to claim 3, wherein each pattern of the transmission mask comprises liquid crystals, the lighting system further including a set of electrodes arranged on either side of the patterns and a control unit arranged to supply power to the electrodes so as to individually control the transmittance of each pattern.

8. The system according to claim 3, wherein the light source is monochromatic.

9. The system according to claim 3, wherein the light source is non-coherent.

10. The system according to claim 1, wherein the plenoptic camera includes:
    a photosensor comprising a set of sensing elements, and a set of microlenses, each microlens being associated with a subset of sensing elements of the photosensor such that each subset of sensing elements can generate a sub-image.

11. The system according to claim 10, wherein the processing unit is arranged to search, for each sequence of sub-images associated with a given microlens and for each pixel of the sub-images considered, the pixel having the most similar intensity vector from among the pixels of the sequences of sub-images associated with the neighbouring microlenses of the given microlens.

12. The system according to claim 1, wherein the processing unit is further arranged to determine depth information for each imaged surface element as a function of the matched pixels associated with said imaged surface element.

13. A method for determining the three-dimensional profile of a surface comprising the steps of:
  acquiring a sequence of plenoptic images, each plenoptic image being formed by a set of pixels which are each associated with a light intensity of an imaged surface element, and comprising a plurality of sub-images of the surface from different viewing angles,
  projecting, onto the surface, a sequence of structured images which is synchronised with the sequence of plenoptic images, so that each imaged surface element is illuminated by a succession of light intensities which is different from the successions of light intensities which illuminate the other imaged surface elements,
  constructing, for each pixel of the plenoptic image, an intensity vector which represents the succession of light intensities of the imaged surface element corresponding to the pixel in question, and
  matching each pixel of a sub-image with a pixel of another sub-image as a function of a similarity between the intensity vectors thereof.

* * * * *